US011500585B2

(12) United States Patent
Li

(10) Patent No.: US 11,500,585 B2
(45) Date of Patent: Nov. 15, 2022

(54) SERVER AND METHOD FOR STORING ARCHIVAL DATA

(71) Applicant: ALIBABA GROUP HOLDING LIMITED, Grand Cayman (KY)

(72) Inventor: Shu Li, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 85 days.

(21) Appl. No.: 17/065,104

(22) Filed: Oct. 7, 2020

(65) Prior Publication Data

US 2022/0107755 A1 Apr. 7, 2022

(51) Int. Cl.
*G06F 3/06* (2006.01)
*G06F 11/10* (2006.01)
*G06F 13/16* (2006.01)

(52) U.S. Cl.
CPC .......... *G06F 3/0659* (2013.01); *G06F 3/0619* (2013.01); *G06F 3/0689* (2013.01); *G06F 11/1076* (2013.01); *G06F 13/1668* (2013.01)

(58) Field of Classification Search
CPC .... G06F 3/0659; G06F 3/0662; G06F 3/0619; G06F 3/0689; G06F 11/1076
See application file for complete search history.

(56) References Cited

U.S. PATENT DOCUMENTS

| 2014/0052706 | A1* | 2/2014 | Misra | G06F 16/1837 |
| | | | | 707/698 |
| 2014/0115579 | A1* | 4/2014 | Kong | G06F 3/0662 |
| | | | | 718/1 |
| 2019/0129649 | A1* | 5/2019 | Zhong | G06F 3/0604 |
| 2020/0125460 | A1* | 4/2020 | Selvaraj | G06F 3/0614 |
| 2021/0019283 | A1* | 1/2021 | Landman | G06F 9/542 |

* cited by examiner

*Primary Examiner* — Shelly A Chase
(74) *Attorney, Agent, or Firm* — Finnegan, Henderson, Farabow, Garrett & Dunner, LLP

(57) ABSTRACT

The present disclosure relates to a method for storing data. The method includes: writing an input data to a first memory and a second memory; writing one or more first data slices in the input data stored in the first memory respectively to one or more first nodes in a storage cluster; encoding the input data stored in the second memory to generate one or more second data slices; and writing the one or more second data slices respectively to one or more second nodes in the storage cluster.

21 Claims, 7 Drawing Sheets

SERVER AND METHOD FOR STORING ARCHIVAL DATA

TECHNICAL FIELD

The present disclosure generally relates to data storage, and more particularly, to methods, systems, and non-transitory computer readable media for archival storage.

BACKGROUND

Modern-day data centers can have storage clusters that possess a huge amount of data for archival purpose, and the overall data amount increases rapidly. The archival data is rarely modified or deleted but can be read per request following a service level agreement (SLA). Various storage medium, such as tapes, compact disks, hard disk drives, etc., can be used to store the archival data. Due to the growing size of the data stored in storage clusters, reducing the total cost of ownership (TCO) without sacrificing the data reliability becomes a key requirement of the archival service.

SUMMARY OF THE DISCLOSURE

Embodiments of the present disclosure provide a server. The server includes a host bus adapter including a first memory and communicatively coupled to a storage cluster, a second memory, and one or more processors communicatively coupled to the host bus adapter and the second memory and configured to execute a set of instructions to cause the server to: write an input data received by the server to the first memory and the second memory; write one or more first data slices in the input data stored in the first memory respectively to one or more first nodes in the storage cluster; encode the input data stored in the second memory to generate one or more second data slices; and write the one or more second data slices respectively to one or more second nodes in the storage cluster.

Embodiments of the present disclosure also provide a method for storing data. The method includes: writing an input data to a first memory and a second memory; writing one or more first data slices in the input data stored in the first memory respectively to one or more first nodes in a storage cluster; encoding the input data stored in the second memory to generate one or more second data slices; and writing the one or more second data slices respectively to one or more second nodes in the storage cluster.

Embodiments of the present disclosure also provide a non-transitory computer-readable storage medium storing a set of instructions that are executable by one or more processors of a device to cause the device to perform a method for storing data. The method includes: writing an input data to a first memory and a second memory; writing one or more first data slices in the input data stored in the first memory respectively to one or more first nodes in a storage cluster; encoding the input data stored in the second memory to generate one or more second data slices; and writing the one or more second data slices respectively to one or more second nodes in the storage cluster.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DETAILED DESCRIPTION

Figure 1A:
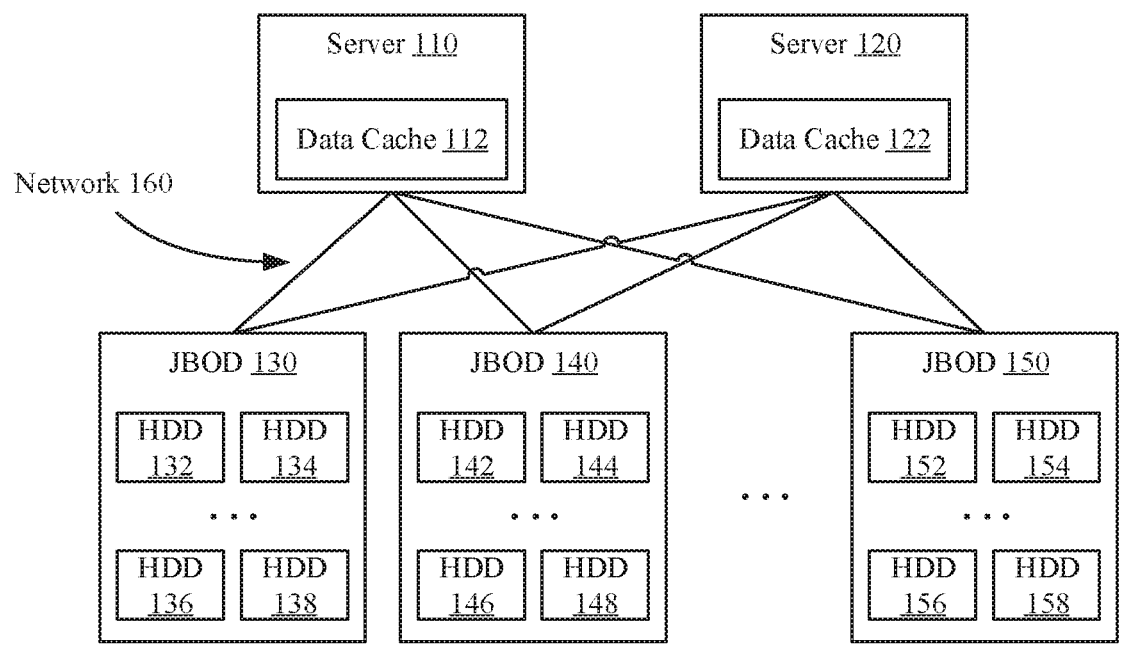
FIG. 1A is a diagram illustrating an example architecture of an archival storage system, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses, systems, and methods consistent with aspects related to the disclosure as recited in the appended claims. The terms and definitions provided herein control, if in conflict with terms or definitions incorporated by reference.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C. The term "exemplary" is used in the sense of "example" rather than "ideal."

In modern day data storage systems, the storage unit can be hard disk drives ("HDDs"). HDDs are electromechanical devices, which store data by manipulating the magnetic field of small portions of a rapidly rotating disk composed of ferromagnetic material. But HDDs have several limitations that make them less favored in modern day systems. In particular, the transfer speeds of HDDs are largely stagnated. The transfer speed of an HDD is largely determined by the speed of the rotating disk, which begins to face physical limitations above a certain number of rotations per second (e.g., the rotating disk experiences mechanical failure and fragments). Having largely reached the current limits of angular velocity sustainable by the rotating disk, HDD speeds have mostly plateaued. However, CPU's processing speed did not face a similar limitation. As the amount of data accessed continued to increase, HDD speeds increasingly became a bottleneck on system performance. This led to the search for and eventually introduction of a new memory storage technology.

To compensate for the shortcomings of HDDs, an alternative storage technology ultimate chosen was flash memory. Flash storage is composed of circuitry, principally logic gates composed of transistors. Since flash storage stores data via circuitry, flash storage is a solid-state storage technology, a category for storage technology that does not have (mechanically) moving components. A solid-state based device has advantages over electromechanical devices such as HDDs, because solid-state devices does not face the physical limitations or increased chances of failure typically imposed by using mechanical movements. Flash storage is faster, more reliable, and more resistant to physical shock. As its cost-per-gigabyte has fallen, flash storage has become increasingly prevalent, being the underlying technology of flash drives, SD cards, the non-volatile storage unit of smartphones and tablets, among others. And in the last decade, flash storage has become increasingly prominent in PCs and servers in the form of solid-state drives ("SSDs").

SSDs are, in common usage, secondary storage units based on flash technology. Technically referring to any secondary storage unit that does not involve mechanically moving components like HDDs, SSDs are made using flash technology. As such, SSDs do not face the mechanical limitations encountered by HDDs. SSDs have many of the same advantages over HDDs as flash storage such as having significantly higher speeds and much lower latencies. However, SSDs have several special characteristics that can lead to a degradation in system performance if not properly managed. In particular, SSD performs a process known as garbage collection before the SSD can overwrite any previously written data. The process of garbage collection can be resource intensive, degrading an SSD's performance. Moreover, the cost of SSDs is generally more expensive, and the maintenance cost for operating SSDs is more expensive as well. Therefore, for a database storage system, it is important to operate on both HDDs and SSDs to separate different types of data to store in either HDDs or SSDs.

In modern day data storage systems, data hotness is a general way to determine if data is updated or accessed frequently or not. In many systems, data that are accessed frequently can usually be stored in data storages that provide quicker access speed (e.g., SSDs), and data that are accessed or updated infrequently can be archived in data storages that are cheap to maintain and operate, but provide a slower access speed. As a result, there is a need to periodically migrate and archive at least a portion of the data into archive nodes. This archiving operation allows the data storage system to preserve more valuable data storages (e.g., SSDs) for hot data.

In existing archival systems, the data cache in the server form an intermediate distributed cluster for both write and read operation, which stores multiple copies to ensure the data reliability and consumes considerable bandwidth and capacity. In addition, because the read cache and write cache share the cache capacity, the cache cannot provide a stable cache hit performance.

In various embodiments of the present disclosure, enlarged throughput and reduced average access latency can be achieved by modifying the write path and read path in archival systems. With the assistance of a persistent memory in the HBA, the cache cluster is bypassed in write operations. By removing the shared usage and the multiple replica data, archival systems can also benefit from the enlarged cache capacity and throughput in read operations and improve the cache hit performance.

FIG. 1A is a diagram illustrating an example architecture of an archival storage system 100, consistent with some embodiments of the present disclosure. In some embodiments, an archive cluster may have many archive nodes, and each archive node can include one or more JBODs (acronym for "Just a Bunch of Disks"). In some embodiments, after the data have been transferred into the archive nodes, storage devices storing the original data can be erased to load new batches of data. In typical scenarios of archival services provided in archival storage system 100, one set of data is generally written once without update, and followed with multiple times of read requests, which is known as write-once-read-multiple (WORM).

As shown in FIG. 1A, archival storage system 100 includes servers 110, 120 and JBODs 130, 140, and 150. Servers 110, 120 respectively include data caches 112 and 122. JBODs 130, 140, and 150 respectively include multiple storage devices 132-138, 142-148, and 152-158 as the storage drives. In some embodiments, servers 110 and 120 are connected with JBODs 130, 140, and 150 via a network 160 using Serial Attached SCSI (SAS) cables. Particularly, a SAS network typically includes one or more SAS initiators (e.g., servers 110 and 120) coupled to one or more SAS targets (storage devices 132-138, 142-148, and 152-158) via one or more SAS expanders, which expand the number of ports of a SAS network domain used to interconnect the SAS devices. Two servers 110 and 120 form the dual agents for the high availability (HA), adding redundancy to system 100 so that the failure of a single server does not cause the failure of the system.

Data caches 112 and 122 in servers 110, 120 may be Conventional Magnetic Recording (CMR) HDDs forming an intermediate distributed cluster. Storage devices 132-138, 142-148, and 152-158 in JBODs 130, 140, and 150 may be Shingled Magnetic Recording (SMR) HDDs, which provide append-only write characteristics that provide a high write performance.

Figure 1B:
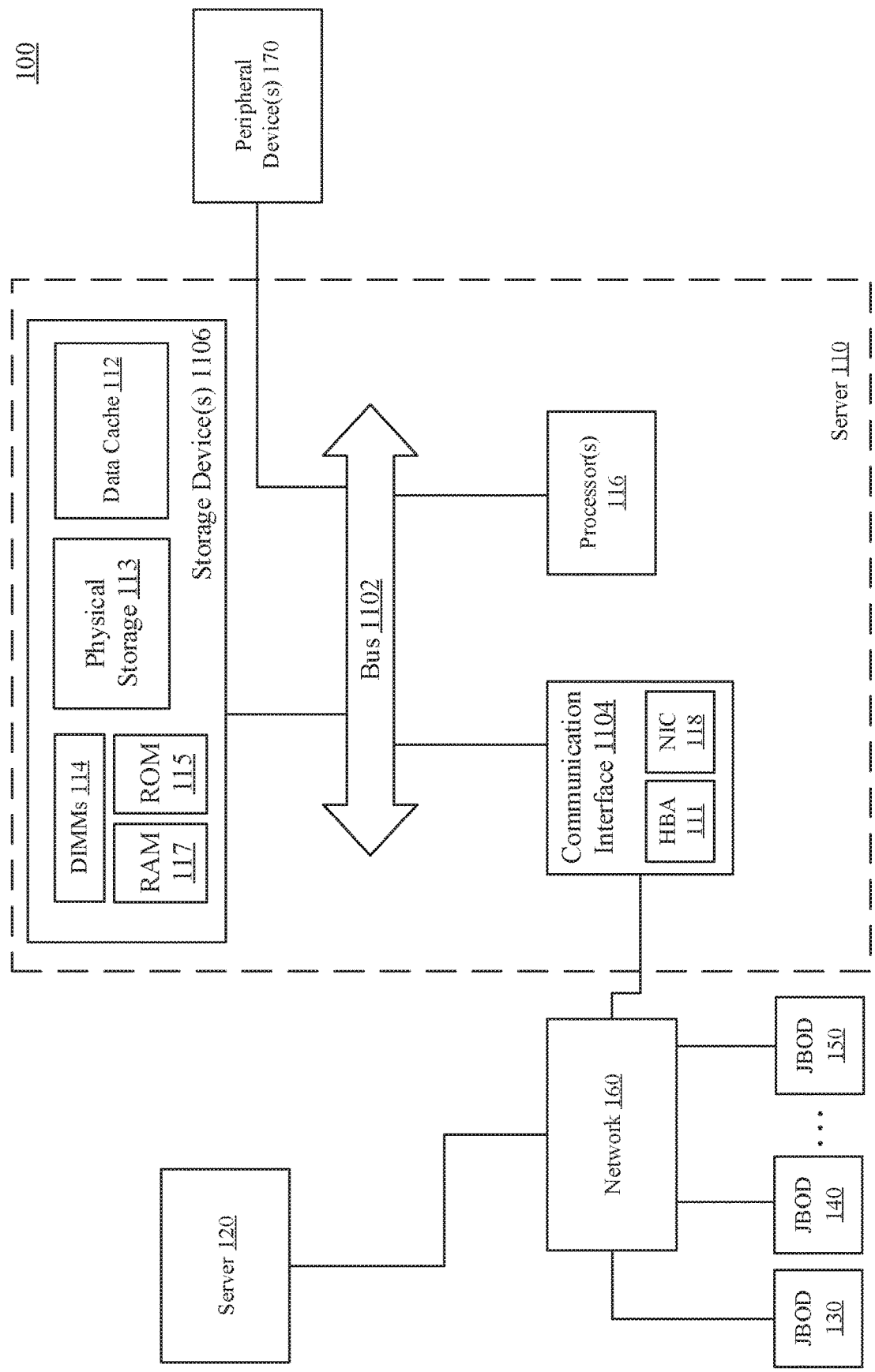
FIG. 1B is a diagram illustrating an exemplary server, consistent with some embodiments of the present disclosure.

The archival operations can be performed by server 110 or server 120 of archival storage system 100. FIG. 1B is a diagram illustrating an exemplary server 110 with more details, consistent with some embodiments of the present disclosure. As shown in FIG. 1B, server 110 includes a bus 1102 or other communication mechanism for communicating information, and one or more processors 116 communicatively coupled with bus 1102 for processing information. Processor(s) 116 can be, for example, one or more microprocessors.

Server 110 can transmit data to or communicate with server 120 (or other servers or front-end devices in archival storage system 100) through network 160. Communication interface 1104 of server 110 is connected to network 160. In some embodiments, communication interface 1104 may include a host bus adapter (HBA) 111 and a network interface card (NIC) interface 118. In addition, in some embodiments, server 110 can be communicatively coupled via bus 1102 to one or more peripheral devices 170, which include displays (e.g., cathode ray tube ("CRT"), liquid crystal display ("LCD"), touch screen, etc.) or input devices (e.g., keyboard, mouse, soft keypad, etc.). In some embodiments, server 110 can be implemented using customized hard-wired logic, one or more ASICs or FPGAs, firmware, or program logic that in combination with the server causes server 110 to be a special-purpose machine.

Server 110 further includes storage device(s) 1106, which may include data cache 112, dual in-line memory modules (DIMMs) 114, and other storage components, such as physical storage module(s) 113 (e.g., hard drive, solid-state drive, etc.), read only memory ("ROM") module(s) 115, or random access memory ("RAM") module(s) 117. Storage device(s) 1106 can be communicatively coupled with processor(s) 116 via bus 1102. Storage device(s) 1106 may include a main memory, which can be used for storing temporary variables or other intermediate information during execution of instructions to be executed by processor(s) 116. Such instructions, after being stored in non-transitory storage media accessible to processor(s) 116, render server 110 into a special-purpose machine that is customized to perform operations specified in the instructions. The term "non-transitory media" as used herein refers to any non-transitory media storing data or instructions that cause a machine to operate in a specific fashion. Such non-transitory media can include non-volatile media and/or volatile media. Non-transitory media include, for example, optical or magnetic disks, dynamic memory, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processor(s) 116 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to the main memory within storage device(s) 1106, from which processor(s) 116 retrieve and execute the instructions. In some embodiments, server 120 may also include the same or similar components and devices as those in server 110 illustrated in FIG. 1B, which will not be repeated herein for brevity.

Figure 2A:
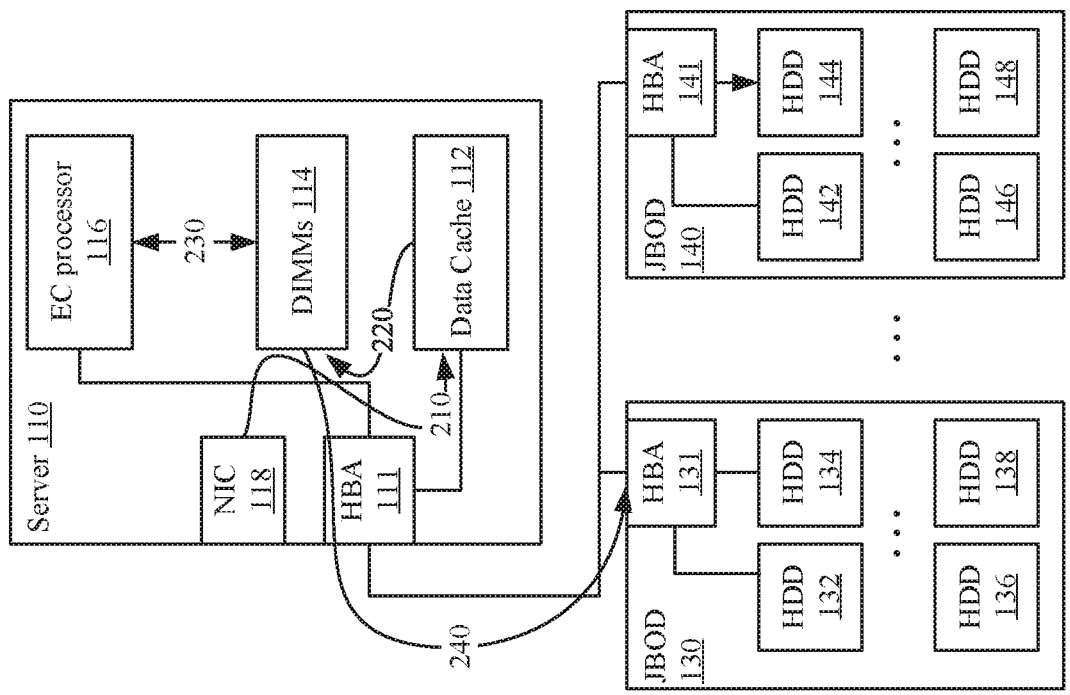
FIG. 2A is a diagram illustrating a write path when writing data into multiple storage devices, consistent with some embodiments of the present disclosure.
Figure 2B:
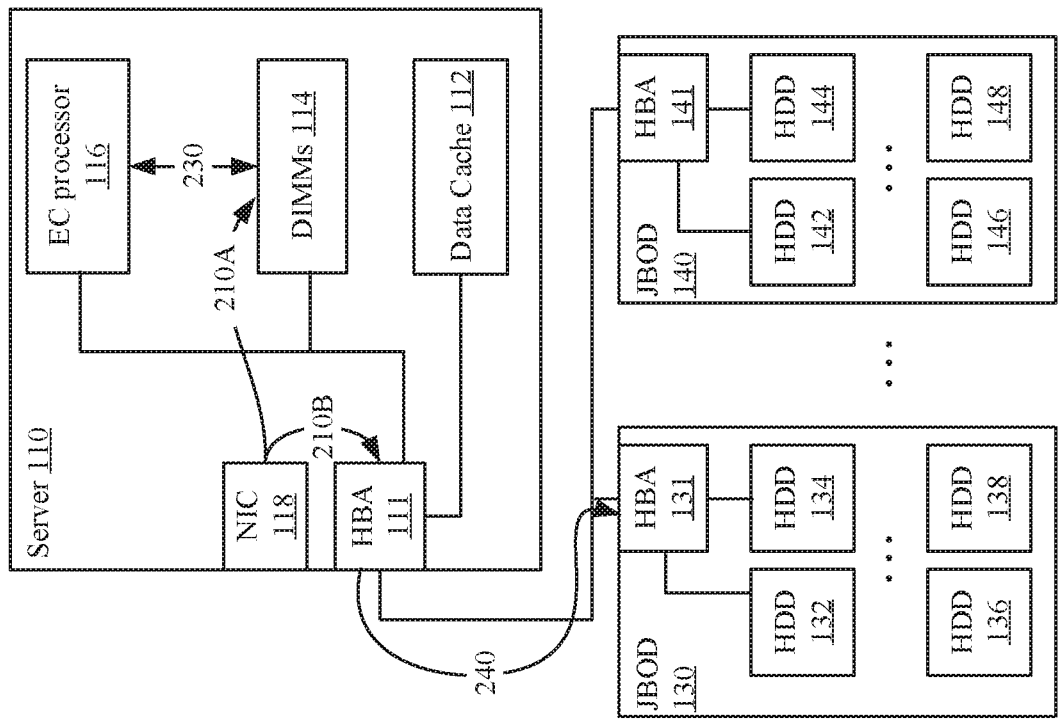
FIG. 2B is a diagram illustrating another write path when writing data into multiple storage devices, consistent with some embodiments of the present disclosure.

FIG. 2A and FIG. 2B are diagrams respectively illustrating two different write paths when writing data into multiple storage devices (e.g., SMR HDDs in JBODs), consistent with some embodiments of the present disclosure. In some embodiments, a front-end device sends portions of user slices to server 110. A portion of a user slice is sometimes referred to as a "data chunk." In the write path shown in FIG. 2A, data to be archived (e.g., user slices) can first be received from the front-end device via network interface card (NIC) interface 118 and copied to dual in-line memory modules (DIMMs) 114 of server 110. Particularly, DIMMs 114 can include a series of dynamic random-access memory (DRAM) integrated circuits. As shown in the data path denoted by arrow line 210, server 110 writes multiple copies into data cache 112 for writing data into the cache cluster.

As shown in the data path denoted by arrow lines 220 and 230, processor 116 can function as an erasure code (EC) processor and read the stored data from data cache 112 and run software for implementing erasure coding (EC) encoding to generate an EC codeword. Then, as shown in the data path denoted by arrow lines 230 and 240, the EC codeword is partitioned into multiple slices or blocks and, via host bus adapter (HBA) 111 at the server side and an HBA 131 or 141 at the JBOD side, respectively written into storage devices 132-138 or 142-148 to complete an asynchronous write of archival data.

In some systems, the write command can be acknowledged as completed after the input data is written into data cache 112. However, the asynchronous write still results in a throughput bottleneck, especially when the amount of archival data is large.

The write path in FIG. 2B shows a different approach, which simplifies the IO stack and utilizes the advantage of SMR HDDs. As shown in FIG. 2B, the incoming user slices are sent into DIMMs 114 for EC encoding as denoted in arrow line 210A. At the same time, another copy of the incoming user slices is directly sent from NIC interface 118 to a persistent memory (PEME) in HBA 111 through a peer-to-peer transfer of PCIe devices as denoted in arrow line 210B. That is, it is not required to write redundant multiple copies in data cache 112 to ensure the data reliability in write operations, and during the transmission of the input data from NIC interface 118 to the persistent memory in HBA 111, the cache cluster (e.g., data cache 112) is bypassed.

Accordingly, before the EC encoding is completed, the user slices of EC codeword can be written into storage devices 132-138 or 142-148 without waiting for the EC encoding result.

EC processor 116 is configured to encode the received data chunk (e.g., user slices stored in DIMMs 114) using a selected erasure code to generate an EC codeword. In various embodiments, an erasure code includes a forward error correction (FEC) code and one that transforms an input message (e.g., user data bits) into a codeword of a longer length such that the original message can be recovered from a subset of the symbols of the codeword. Example erasure codes include Reed Solomon and the K+1 parity check. In some embodiments, an erasure code may be selected to use to encode a data chunk based on a computer program or a user configuration. According to the selected erasure code, EC processor 116 generates y parity bits with x user bits (e.g., input bits) from the data chunk, thereby creating the codeword with a length of x+y bits. So, after EC encoding, the amount of data increases to (x+y)/x times of the incoming data. The original data chunk can be recovered from a subset of the erasure code group based on the erasure code decoding tolerance of the selected erasure code.

After EC processor 116 obtains the EC codeword generated in the EC encoding process, the user bits of the EC codeword are dropped. The generated parity bits are then divided into multiple parity slices and written into storage devices 132-138 or 142-148. Thus, server 110 separately writes user slices of the original input data and parity slices obtained by the EC encoding.

Figure 3:
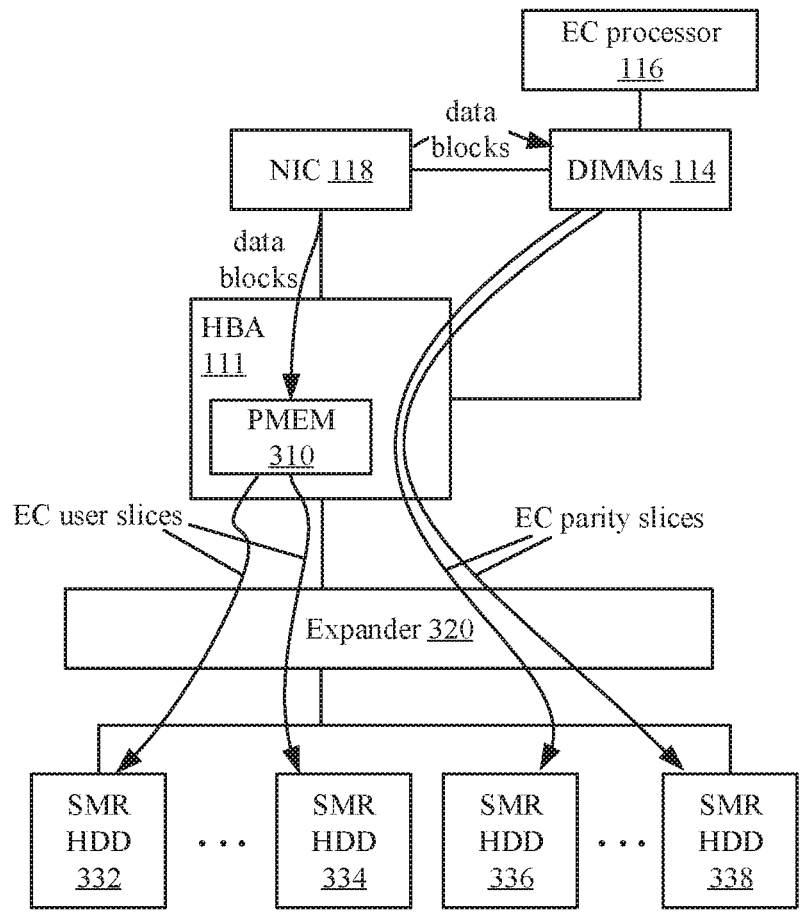
FIG. 3 is a diagram illustrating the path of user slices and parity slices in write operations with more details, consistent with some embodiments of the present disclosure.

For further understanding, FIG. 3 is a diagram illustrating the path of user slices and parity slices in write operations with more details, consistent with some embodiments of the present disclosure. For example, as shown in FIG. 3, the original input data may include K user slices for one codeword, and the K user slices are first stored in a persistent memory 310 in HBA 111, and then respectively written into K SMR HDDs 332, 334, via an SAS expander 320, from persistent memory 310. On the other hand, after dropping the user bits, M parity slices are generated in the EC encoding process and stored in DIMMs 114. The M parity slices can be written into the remaining M SMR HDDs 336, 338 directly, via HBA 111 and SAS expander 320, without buffering in persistent memory 310 of HBA 111. As illustrated in FIG. 3, during the transmission of the parity slices from DIMMs 114 to SMR HDDs 336, 338, persistent memory 310 is bypassed. If all write operations are successful, a total number of N (i.e., K+M) slices are archived in JBODs, and any combination of K slices can be used to reconstruct the original data, even if other slices are lost or unavailable.

In some embodiments, because the EC encoding is maximum distance separable (MDS) code, server 110 can notify the front-end device to report that this data chunk is written successfully as soon as K out of all N slices are written successfully, without waiting for the rest of the N-K slices. In some embodiments, the data held in persistent memory 310 is not removed until all N slices are written into SMR drives. If one or more slices are not successfully written within a given time period, an internal maintenance ticket can be triggered in response to the time out error for further investigations. After all N slices of the EC codeword are written successfully, server 110 can delete the user slices buffered in persistent memory 310 accordingly and confirm that the write process is completed.

That is, in some embodiments, server 110 can send two levels of acknowledgements with respect to a data chunk to the front-end device. In response to receiving the two levels of acknowledgements, the front-end device can determine that the data chunk has been successfully stored. The first acknowledgement is an acknowledgement indicating that K out of all N slices are archived in JBODs successfully, and the second acknowledgement is an acknowledgement indicating that all N slices, including K user slices and M parity slices that are generated based on the sent data chunk, have been successfully archived in JBODs.

Figure 4:
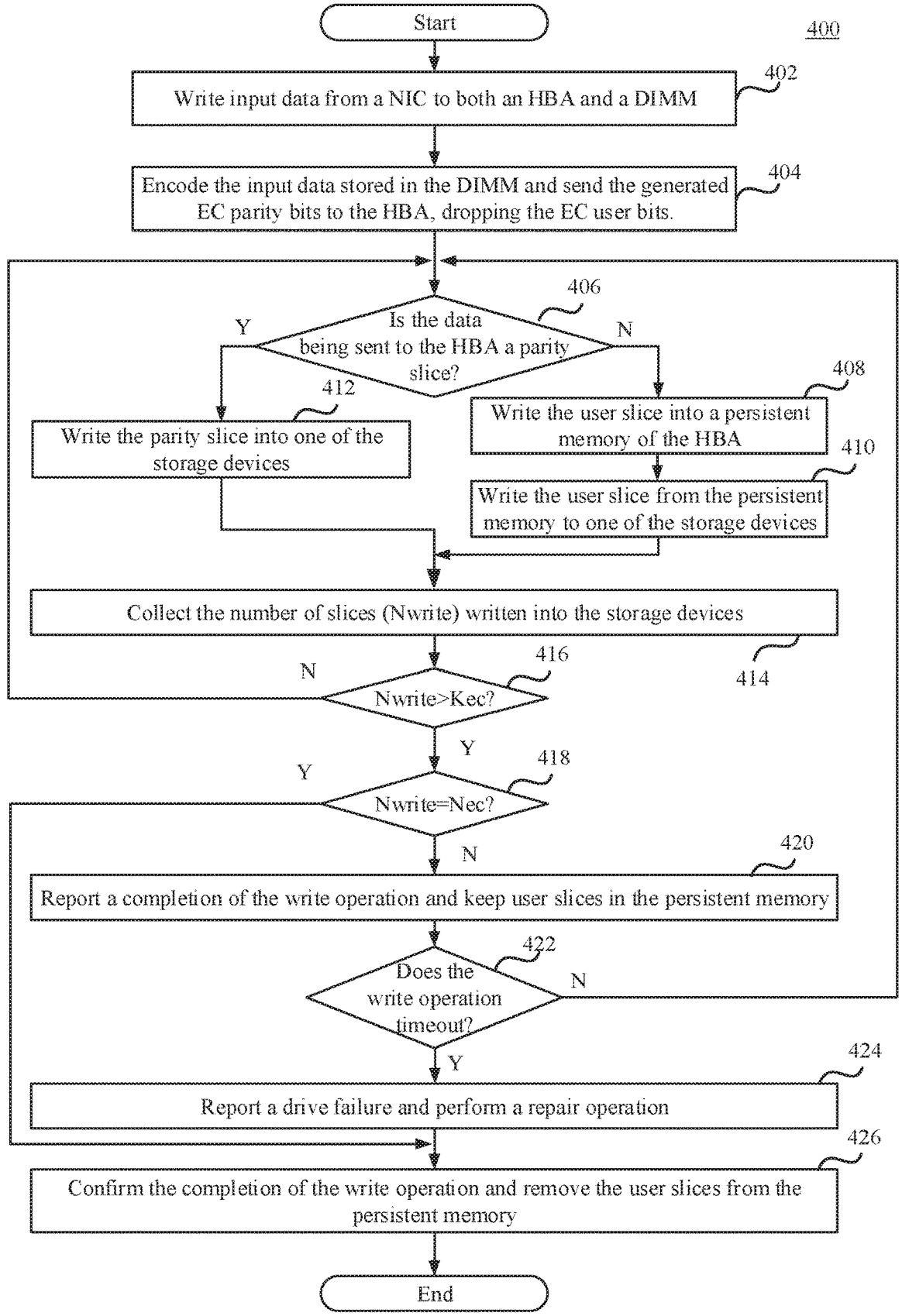
FIG. 4 illustrates an exemplary flow diagram for performing a method for storing data, consistent with some embodiments of the present disclosure.

FIG. 4 illustrates an exemplary flow diagram for performing a method 400 for storing data, consistent with some embodiments of the present disclosure. Method 400 can be performed in an archival storage system (e.g., archival storage system 100 in FIG. 1A and FIG. 1B) by an agent (e.g. server 110 or 120 in FIG. 1A and FIG. 1B or server 110 in FIG. 2B) according to some embodiments of the present disclosure.

Method 400 in FIG. 4 illustrates operations for the archive process performed by the server. At step 402, the server writes input data from a NIC to both an HBA (e.g., HBA 111 in FIGS. 1B and 1B FIG. 3) and a DIMM (e.g., DIMMs 114 in FIGS. 1B and 1B FIG. 3).

At step 404, the server encodes the input data stored in the second memory to generate one or more parity slices. Particularly, an EC encoder, which may be implemented by a CPU running the EC program, can generate a codeword associated with the input data based on an erasure code. When the EC encoding is completed, the server can drop the EC user bits (i.e., user slices) and keep the EC parity bits (i.e., parity slices) in the codeword and send the EC parity bits to the HBA.

At step 406, the server identifies whether the data transferred to the HBA belongs to a user slice (e.g., user bits in the input data from the NIC) or a parity slice (e.g., parity bits generated by the EC encoding). If the data is a user slice from the NIC (step 406—no), the server performs step 408 and writes the data into a memory (e.g., persistent memory 310 in FIG. 3) in the HBA. By steps 402 and 408, the server writes input data from the NIC to both a first memory (e.g., persistent memory 310 in FIG. 3) and a second memory (e.g., DIMMs 114 in FIG. 3). Then, at step 410, the server writes user slices into the storage cluster (e.g., SMR HDDs 332-338 in FIG. 3) via SAS fabric.

On the other hand, if the data transferred to the HBA is a parity slice generated in step 404 (step 406—yes), the server does not write the data into the persistent memory. At step 412, the server, bypassing the memory in the HBA, writes the parity slice from the second memory into the storage cluster (e.g., SMR HDDs 332-338 in FIG. 3) via SAS fabric.

Particularly, when writing the data into the storage cluster in steps 410 and 412, the server writes one or more user slices from the first memory respectively to one or more first nodes (e.g., SMR HDDs 332 and 334 in FIG. 3), and writes one or more parity slices from the second memory respectively to one or more second nodes (e.g., SMR HDDs 336 and 338 in FIG. 3).

After writing the data into the storage cluster in steps 410 or 412, at step 414, the server counts the number of user slices and parity slices successfully written into the storage cluster. At steps 416 and 418, the server determines whether a total number (Nwrite) of written user slices and parity slices being greater than a threshold value (Kec) and whether all user slices and parity slices are written. Responsive to a total number of written user slices and parity slices being smaller than the threshold value (step 416—no), the server repeats the operations above to write the next data slice into the storage cluster, until the total number of written data slices being greater than the threshold value. Responsive to the total number of written user slices and parity slices being greater than the threshold value (step 416—yes), but not equal to the number of all data slices (Nec) (step 418—no), the server performs step 420 and reports a completion of the write operation, because after Kec out of all Nec data slices are written successfully, the original data can be reconstructed and read out from the storage cluster. In some embodiments, at this stage, the input data (e.g., user slices) is still stored in the persistent memory in the HBA as a backup copy.

Then, at step 422, the server determines whether a timeout occurs after the reporting of the completion. The timeout indicates that one or more user or parity slices are not successfully written into the storage cluster within a predetermined time period. Before the timeout event occurs (step 422—no), the server repeats the operations above to write the next data slice into the storage cluster. If the timeout event occurs (step 422—yes), the server, responsive to the timeout, performs step 424 and reports a drive failure and performs a repair operation to solve the issue. After the issue is cleared, the server can repair the input data based on the written user slices, the written parity slices, or a combination of the written user slices and the written parity slices.

After the server writes all user slices and parity slices into the storage cluster (step 418—yes), at step 426, the server confirms that the write operation is completed without pending issues, and removes the input data (e.g., user slices) from the persistent memory in the HBA.

By performing method 400 described above, the server can perform archive operations with individual writing paths which do not involve the cache cluster. That is, in some embodiments, no data is copied into the CMR HDD in the server during the archive process.

Figure 5:
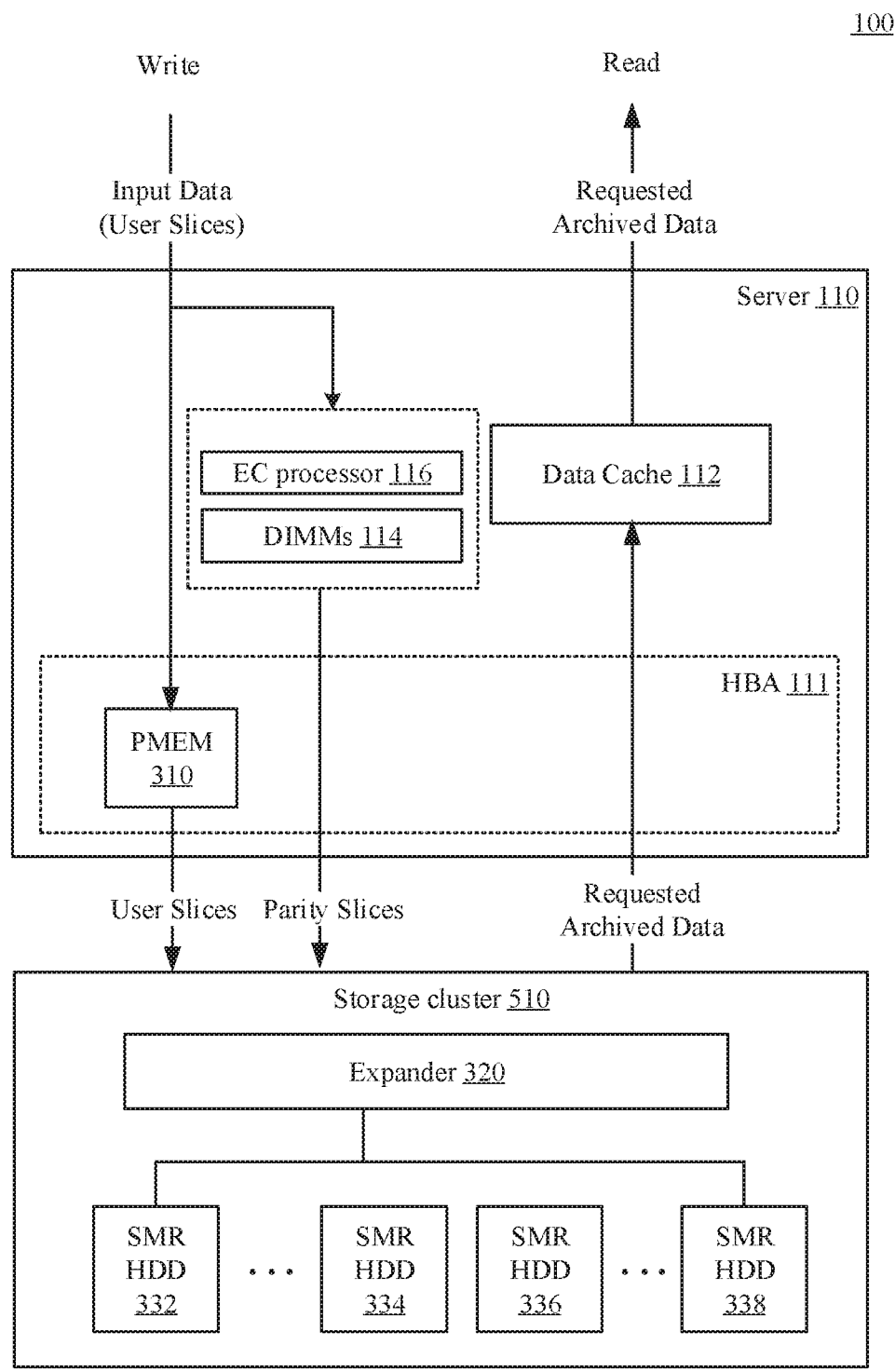
FIG. 5 illustrates exemplary independent paths for read and write operations performed in the archival storage system, consistent with some embodiments of the present disclosure.

Reference is now made to FIG. 5, which illustrates exemplary independent paths for read and write operations performed in archival storage system 100, consistent with some embodiments of the present disclosure. For ease of understanding, in the embodiments of FIG. 5, server 110 is the active agent to perform the read and write operations. In a dual-agent or multi-agent architecture for the high availability, other server(s) in archival storage system 100 (e.g., server 120 in FIG. 1A) can perform the same or similar operations when they are activated. Accordingly, when a failure occurs in the active server, another server can take over control from the failed server to keep archival storage system 100 running.

As shown in FIG. 5, server 110 is configured to communicate with a storage cluster 510 to read and write data. Storage cluster 510 can be implemented by SAS expander 320 and SMR HDD 332-338 in one or more JBODs, which have been explained in the embodiments of FIG. 3. When writing data into storage cluster 510, user slices and parity slices are transferred via different paths, and both paths do not occupy the capacity of data cache 112 in server 110. Details of the write operations have been explained above and thus are not repeated herein.

When the archived data is read out from storage cluster 510, the data is buffered in data cache 112 of server 110. That is, the capacity of data cache 112 can be used as a read cache. When the data is cached in data cache 112, server 110 can only keep one copy, rather than multiple copies, simultaneously. Compared to storing multiple copies in a share cache which consumes considerable bandwidth and cache capacity for both read and write operations, by converting data cache 112 from the shared cache to a read cache, the overall read performance, such as input/output per second (IOPS), can be improved by the dedicated read cache. Because the data can be fetched from SMR HDD 332-338 in storage cluster 510, persistent storage is not required in the cache cluster. Accordingly, server 110 provides an enlarged available cache capacity, and the cache hit rate can be enhanced.

In view of above, as proposed in various embodiments of the present disclosure, the proposed devices and methods can simplify the access paths for archival storage systems with reduced average access latency and enhanced cache capacity and throughput utilization. Considering the write-once-read-multiple characteristics of the archival service having no or rare delete or update operations, the proposed devices and methods can exploit the potential of the SMR HDDs. In addition, in read operations, the read cache can provide a stable cache hit performance.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object-oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which includes one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not to be considered essential features of those embodiments, unless the embodiment is inoperative without those elements.

The embodiments may further be described using the following clauses:

1. A non-transitory computer-readable storage medium storing a set of instructions that are executable by one or more processors of a device to cause the device to perform a method for storing data, comprising:

writing an input data to a first memory and a second memory;

writing one or more first data slices in the input data stored in the first memory respectively to one or more first nodes in a storage cluster;

encoding the input data stored in the second memory to generate one or more second data slices; and writing the one or more second data slices respectively to one or more second nodes in the storage cluster.

2. The non-transitory computer-readable storage medium of clause 1, wherein the set of instructions that are executable by the one or more processors cause the device to encode the input data stored in the second memory by:

generating a codeword associated with the input data based on an erasure code, the codeword comprising the one or more first data slices and the one or more second data slices; and dropping the one or more first data slices from the codeword.

3. The non-transitory computer-readable storage medium of clause 1 or clause 2, wherein the set of instructions that are executable by the one or more processors cause the device to perform:

responsive to a total number of one or more written first data slices and one or more written second data slices being greater than a threshold value, reporting a completion of the write operation.

4. The non-transitory computer-readable storage medium of clause 3, wherein the set of instructions that are executable by the one or more processors cause the device to perform:

responsive to a timeout after the reporting of the completion, reporting a drive failure and repairing the input data based on the one or more written first data slices, the one or more written second data slices, or a combination thereof.

5. The non-transitory computer-readable storage medium of any one of clauses 1 to 4, wherein the set of instructions that are executable by the one or more processors cause the device to perform:

removing the input data from the first memory after writing all first data slices and second data slices into the one or more first nodes and the one or more second nodes.

6. The non-transitory computer-readable storage medium of any one of clauses 1 to 5, wherein the set of instructions that are executable by the one or more processors cause the device to write the one or more second data slices by:

bypassing the first memory during a transmission of the one or more second data slices from the second memory to the one or more second nodes.

7. The non-transitory computer-readable storage medium of any one of clauses 1 to 6, wherein the set of instructions that are executable by the one or more processors cause the device to write the one or more first data slices by:

transmitting, via a peer-to-peer transfer, the input data from a network interface controller to the first memory in a host bus adapter, without storing the input data in a cache cluster.

8. A server comprising:

a host bus adapter comprising a first memory and communicatively coupled to a storage cluster;

a second memory; and one or more processors communicatively coupled to the host bus adapter and the second memory and configured to execute a set of instructions to cause the server to:

write an input data received by the server to the first memory and the second memory;

write one or more first data slices in the input data stored in the first memory respectively to one or more first nodes in the storage cluster;

encode the input data stored in the second memory to generate one or more second data slices; and write the one or more second data slices respectively to one or more second nodes in the storage cluster.

9. The server of clause 8, wherein the one or more processors are further configured to execute the set of instructions to cause the server to encode the input data stored in the second memory by:

generating a codeword associated with the input data based on an erasure code, the codeword comprising the one or more first data slices and the one or more second data slices; and dropping the one or more first data slices from the codeword.

10. The server of clause 8 or clause 9, wherein the one or more processors are further configured to execute the set of instructions to cause the server to:

responsive to a total number of one or more written first data slices and one or more written second data slices being greater than a threshold value, report a completion of the write operation.

11. The server of clause 10, wherein the one or more processors are further configured to execute the set of instructions to cause the server to:

responsive to a timeout after the reporting of the completion, report a drive failure and repair the input data based on the one or more written first data slices, the one or more written second data slices, or a combination thereof.

12. The server of any one of clauses 8 to 11, wherein the one or more processors are further configured to execute the set of instructions to cause the server to:

remove the input data from the first memory after writing all first data slices and second data slices into the storage cluster.

13. The server of any one of clauses 8 to 12, wherein the one or more processors are further configured to execute the set of instructions to cause the server to write the one or more second data slices by:

bypassing the first memory during a transmission of the one or more second data slices from the second memory to the one or more second nodes.

14. The server of any one of clauses 8 to 13, further comprising:

a network interface controller configured to receive the input data; and a cache cluster configured to store data when reading out data from the storage cluster;

wherein the one or more processors are further configured to execute the set of instructions to cause the server to write the one or more first data slices by transmitting, via a peer-to-peer transfer, the input data from the network interface controller to the first memory without storing the input data in the cache cluster.

15. A method for storing data, comprising:

writing an input data to a first memory and a second memory;

writing one or more first data slices in the input data stored in the first memory respectively to one or more first nodes in a storage cluster;

encoding the input data stored in the second memory to generate one or more second data slices; and writing the one or more second data slices respectively to one or more second nodes in the storage cluster.

16. The method of clause 15, wherein the encoding comprising:

generating a codeword associated with the input data based on an erasure code, the codeword comprising the one or more first data slices and the one or more second data slices; and dropping the one or more first data slices from the codeword.

17. The method of clause 15 or clause 16, further comprising:

responsive to a total number of one or more written first data slices and one or more written second data slices being greater than a threshold value, reporting a completion of the write operation.

18. The method of clause 17, further comprising:

responsive to a timeout after the reporting of the completion, reporting a drive failure and repairing the input data based on the one or more written first data slices, the one or more written second data slices, or a combination thereof.

19. The method of any one of clauses 15 to 18, further comprising:

removing the input data from the first memory after writing all first data slices and second data slices into the one or more first nodes and the one or more second nodes.

20. The method of any one of clauses 15 to 19, wherein the writing the one or more second data slices comprises:

bypassing the first memory during a transmission of the one or more second data slices from the second memory to the one or more second nodes.

21. The method of any one of clauses 15 to 20, wherein the writing the one or more first data slices comprises:

transmitting, via a peer-to-peer transfer, the input data from a network interface controller to the first memory in a host bus adapter, without storing the input data in a cache cluster.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A non-transitory computer-readable storage medium storing a set of instructions that are executable by one or more processors of a device to cause the device to perform a method for storing data, comprising:

writing an input data to a first memory and a second memory, the input data comprising one or more first data slices;

writing the one or more first data slices in the input data stored in the first memory respectively to one or more first nodes in a storage cluster;

encoding the input data stored in the second memory to generate one or more second data slices; and writing the one or more second data slices respectively to one or more second nodes in the storage cluster.

2. The non-transitory computer-readable storage medium of claim 1, wherein the set of instructions that are executable by the one or more processors cause the device to encode the input data stored in the second memory by:

generating a codeword associated with the input data based on an erasure code, the codeword comprising the one or more first data slices and the one or more second data slices; and dropping the one or more first data slices from the codeword.

3. The non-transitory computer-readable storage medium of claim 1, wherein the set of instructions that are executable by the one or more processors cause the device to perform:

responsive to a total number of one or more written first data slices and one or more written second data slices being greater than a threshold value, reporting a completion of the write operation.

4. The non-transitory computer-readable storage medium of claim 3, wherein the set of instructions that are executable by the one or more processors cause the device to perform:

responsive to a timeout after the reporting of the completion, reporting a drive failure and repairing the input data based on the one or more written first data slices, the one or more written second data slices, or a combination thereof.

5. The non-transitory computer-readable storage medium of claim 1, wherein the set of instructions that are executable by the one or more processors cause the device to perform:

removing the input data from the first memory after writing all first data slices and second data slices into the one or more first nodes and the one or more second nodes.

6. The non-transitory computer-readable storage medium of claim 1, wherein the set of instructions that are executable by the one or more processors cause the device to write the one or more second data slices by:

bypassing the first memory during a transmission of the one or more second data slices from the second memory to the one or more second nodes.

7. The non-transitory computer-readable storage medium of claim 1, wherein the set of instructions that are executable by the one or more processors cause the device to write the one or more first data slices by:

transmitting, via a peer-to-peer transfer, the input data from a network interface controller to the first memory in a host bus adapter, without storing the input data in a cache cluster.

8. A server comprising:

a host bus adapter comprising a first memory and communicatively coupled to a storage cluster;

a second memory; and one or more processors communicatively coupled to the host bus adapter and the second memory and configured to execute a set of instructions to cause the server to:

write an input data received by the server to the first memory and the second memory, the input data comprising one or more first data slices;

write the one or more first data slices in the input data stored in the first memory respectively to one or more first nodes in the storage cluster;

encode the input data stored in the second memory to generate one or more second data slices; and write the one or more second data slices respectively to one or more second nodes in the storage cluster.

9. The server of claim 8, wherein the one or more processors are further configured to execute the set of instructions to cause the server to encode the input data stored in the second memory by:
generating a codeword associated with the input data based on an erasure code, the codeword comprising the one or more first data slices and the one or more second data slices; and
dropping the one or more first data slices from the codeword.

10. The server of claim 8, wherein the one or more processors are further configured to execute the set of instructions to cause the server to:
responsive to a total number of one or more written first data slices and one or more written second data slices being greater than a threshold value, report a completion of the write operation.

11. The server of claim 10, wherein the one or more processors are further configured to execute the set of instructions to cause the server to:
responsive to a timeout after the reporting of the completion, report a drive failure and repair the input data based on the one or more written first data slices, the one or more written second data slices, or a combination thereof.

12. The server of claim 8, wherein the one or more processors are further configured to execute the set of instructions to cause the server to:
remove the input data from the first memory after writing all first data slices and second data slices into the storage cluster.

13. The server of claim 8, wherein the one or more processors are further configured to execute the set of instructions to cause the server to write the one or more second data slices by:
bypassing the first memory during a transmission of the one or more second data slices from the second memory to the one or more second nodes.

14. The server of claim 8, further comprising:
a network interface controller configured to receive the input data; and
a cache cluster configured to store data when reading out data from the storage cluster;
wherein the one or more processors are further configured to execute the set of instructions to cause the server to write the one or more first data slices by transmitting, via a peer-to-peer transfer, the input data from the network interface controller to the first memory without storing the input data in the cache cluster.

15. A method for storing data, comprising:
writing an input data to a first memory and a second memory, the input data comprising one or more first data slices;
writing the one or more first data slices in the input data stored in the first memory respectively to one or more first nodes in a storage cluster;
encoding the input data stored in the second memory to generate one or more second data slices; and
writing the one or more second data slices respectively to one or more second nodes in the storage cluster.

16. The method of claim 15, wherein the encoding comprising:
generating a codeword associated with the input data based on an erasure code, the codeword comprising the one or more first data slices and the one or more second data slices; and
dropping the one or more first data slices from the codeword.

17. The method of claim 15, further comprising:
responsive to a total number of one or more written first data slices and one or more written second data slices being greater than a threshold value, reporting a completion of the write operation.

18. The method of claim 17, further comprising:
responsive to a timeout after the reporting of the completion, reporting a drive failure and repairing the input data based on the one or more written first data slices, the one or more written second data slices, or a combination thereof.

19. The method of claim 15, further comprising:
removing the input data from the first memory after writing all first data slices and second data slices into the one or more first nodes and the one or more second nodes.

20. The method of claim 15, wherein the writing the one or more second data slices comprises:
bypassing the first memory during a transmission of the one or more second data slices from the second memory to the one or more second nodes.

21. The method of claim 15, wherein the writing the one or more first data slices comprises:
transmitting, via a peer-to-peer transfer, the input data from a network interface controller to the first memory in a host bus adapter, without storing the input data in a cache cluster.

* * * * *